(12) United States Patent
Ishida

(10) Patent No.: US 7,149,390 B2
(45) Date of Patent: Dec. 12, 2006

(54) WAVEGUIDE SYSTEM, A DEVICE FOR DISPLAYING AN IMAGE USING SUCH A SYSTEM AND A METHOD FOR DISPLAYING AN IMAGE

(75) Inventor: Takehisa Ishida, Singapore (SG)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 10/925,433

(22) Filed: Aug. 25, 2004

(65) Prior Publication Data

US 2005/0089277 A1 Apr. 28, 2005

(30) Foreign Application Priority Data

Oct. 28, 2003 (SG) .............. 200306385-6

(51) Int. Cl.
*G02B 6/26* (2006.01)
*G02F 1/00* (2006.01)
*G02F 1/13* (2006.01)

(52) U.S. Cl. .................. 385/45; 385/16; 385/17; 385/18; 385/39; 385/40

(58) Field of Classification Search .......... 385/45, 385/15, 16, 17, 18, 19, 22, 39, 40; 348/739; 349/193; 372/102; 359/619; 353/31, 38
See application file for complete search history.

(56) References Cited

U.S. PATENT DOCUMENTS

| | | | |
|---|---|---|---|
| 5,802,223 A | | 9/1998 | Nashimoto |
| 5,953,469 A | * | 9/1999 | Zhou .................. 385/22 |
| 6,028,977 A | * | 2/2000 | Newsome .............. 385/147 |
| 6,259,834 B1 | * | 7/2001 | Shani .................. 385/17 |
| 6,681,063 B1 | * | 1/2004 | Kane et al. ............ 385/18 |
| 6,860,606 B1 | * | 3/2005 | Childers et al. ........ 353/31 |
| 6,967,986 B1 | * | 11/2005 | Kowarz et al. ......... 372/102 |
| 2004/0125431 A1 | * | 7/2004 | Mehrl ................ 359/290 |
| 2004/0156580 A1 | * | 8/2004 | Baumann et al. ....... 385/16 |
| 2004/0247236 A1 | * | 12/2004 | Yoshimura et al. ..... 385/16 |
| 2005/0018306 A1 | * | 1/2005 | Yoshida et al. ........ 359/619 |
| 2005/0157268 A1 | * | 7/2005 | Akiyama .............. 353/38 |

FOREIGN PATENT DOCUMENTS

EP 0 978 740 2/2000

OTHER PUBLICATIONS

Kessel, Hornbeck et al, "A MEMS Based Projection Display", Aug. 1998, Proceedings of the IEEE, vol. 86, No. 8, pp. 1687-1704.*
Patent Abstracts of Japan, Publication No. 08-21932, Publication Date Jan. 23, 1996.

* cited by examiner

*Primary Examiner*—Frank G. Font
*Assistant Examiner*—Guy G. Anderson
(74) *Attorney, Agent, or Firm*—Frommer Lawrence & Haug LLP; William S. Frommer; Thomas F. Presson

(57) ABSTRACT

A device such as an integrated display device and projector apparatus using said display device for projecting an image on a screen comprises a number of light sources, waveguides, optical switches, micro-lenses and scanning mirrors. The display apparatus consists of said display device, a modulator circuit, an optical switch controller, a scanning mirror controller, a synchronizer and projection optics. This device enables the projector apparatus to be extremely small and to reduce its power consumption in comparison with conventional projectors.

20 Claims, 5 Drawing Sheets

WAVEGUIDE SYSTEM, A DEVICE FOR DISPLAYING AN IMAGE USING SUCH A SYSTEM AND A METHOD FOR DISPLAYING AN IMAGE

FIELD OF THE INVENTION

The present invention relates to a waveguide system, a device for displaying an image using such a system and a method for displaying an image. In particular, the present invention relates to information display devices, especially to projection display devices.

BACKGROUND OF THE INVENTION

Liquid crystal display (LCD) panels are utilized for most conventional projectors. A typical LCD panel consists of two sheets of polarizer, a liquid crystal cell, thin film transistors (TFT) and colour filters. The light transmittances of these components are approximately 50% for a pair of polarizer sheets, 80% for an aperture of TFT and 30% for colour filters, respectively. Therefore, the total light transmittance of all components is approximately 12%. This means that only 12% of the light from a projection light source can be transmitted through the LCD panel. This inefficiency requires a brighter light source requiring higher power consumption and a larger size. This is one of the major reasons why it is difficult to realize mobile projectors which are operated by batteries.

In view of the foregoing problems With conventional processes and devices, a need exists for an easily applied method for producing a lightweight, low power consumption, portable projection system without compromising performance.

SUMMARY OF THE INVENTION

In general, in a first aspect, the invention comprises a waveguide system comprising:
one or more light sources;
an array of interconnected waveguides arranged to receive light from said one or more light sources; and
a plurality of optical switches associated with the array of waveguides and arranged so as to divert the light from the one or more light sources received by the waveguides to one or more outputs.

According to a second aspect there is provided a device for displaying an image comprising:
the waveguide system defined above; and
an optical switch controller for selecting the outputs of the array of waveguides in sequence to produce a linear scan pattern.

According to a third aspect of the present invention there is provided a method for generating an image comprising:
passing light from one or more light sources to an array of interconnected waveguides;
switching a plurality of optical switches associated with the array of waveguides to divert the light from the one or more light sources received by the waveguides to one or more outputs;
selecting the outputs of the array of waveguides in sequence to produce a linear scan pattern.

Further aspects of the present invention provide an information display device comprising the system and/or device defined above, and preferably a projection display device comprising the system and/or device defined above.

The devices and systems in a preferred embodiment of the present invention are advantageous as they have an exceedingly high light transmission efficiency because there is no component which absorbs a significant amount of light. Therefore the devices and systems do not require large light sources to operate, thereby reducing power consumption and the space required for the light sources. As the elements may be integrated on one chip, the volume of the device which generates a two-dimensional image can be made small. These factors make a projector apparatus using the systems and devices according to the invention compact. In this manner, the devices and systems enable a projector apparatus to be extremely small and have a much reduced power consumption in comparison with conventional projectors. The present invention thereby helps to realize mobile image projectors operated by batteries.

BRIEF DESCRIPTION OF THE DRAWINGS

Preferred features of the invention will now be described, for the sake of illustration only, with reference to the following Figures in which.

DETAILED DESCRIPTION OF PREFERRED EMBODIMENTS

Figure 1:
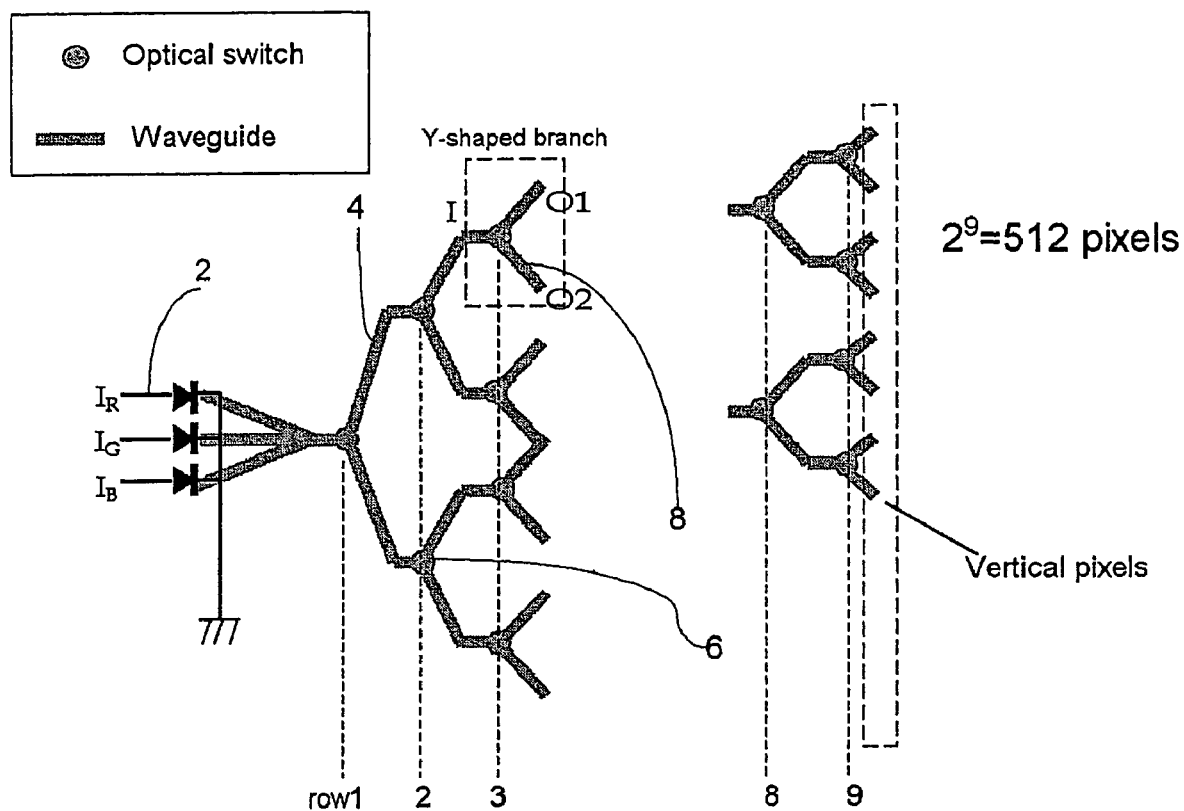
FIG. 1 is a schematic of an integrated display device embodying the invention.

FIG. 1 shows a schematic of a display device embodying the invention comprising an arrangement of light sources 2, waveguides 4, and optical switches 6. The light sources 2 feed light into the waveguides 4 and light is propagated through the waveguides which are connected to the plurality of optical switches 6. The optical switches 6 switch the light received into one of two outlets according to control signals received from control circuits (not shown). The outputs of the switches 6 are each connected to the inputs of a further row of optical switches which, in turn, are cascaded to, for example, nine rows of switches, resulting in 512 output waveguides. Thus, the light fed to the input of the first waveguide may be switched to any one of the 512 output waveguides. This is explained in more detail below.

Light Emitting Diodes (LEDs) or Laser Diodes (LDs) are suitable for the light sources 2. For colour images, red, green and blue LEDs or LDs are required. The intensity of a light source for each colour is preferably modulated independently.

The waveguide 4 consists of multiple Y-shaped branches 8. Each Y-shaped branch 8 has one inlet and two outlets, namely, inlet I, outlet O1 and outlet O2. Each Y-shaped branch 8 has an optical switch 6 at its junction. The optical switch 6 leads the incident light from inlet I to either outlet O1 or O2 depending on its state. In other words, when the light reaches a Y-shaped branch 8, the next route of the light is determined by the state of the optical switch 6.

The Y-shaped branches 8 are aligned in several rows as shown in FIG. 1. The total number of outlets is expressed by the formula $N=2^n$, where N is the total number of outlets and n is the number of rows. A train of light coming through the 512 outlets which are shown in FIG. 1 acts as vertical pixels.

Figure 2:
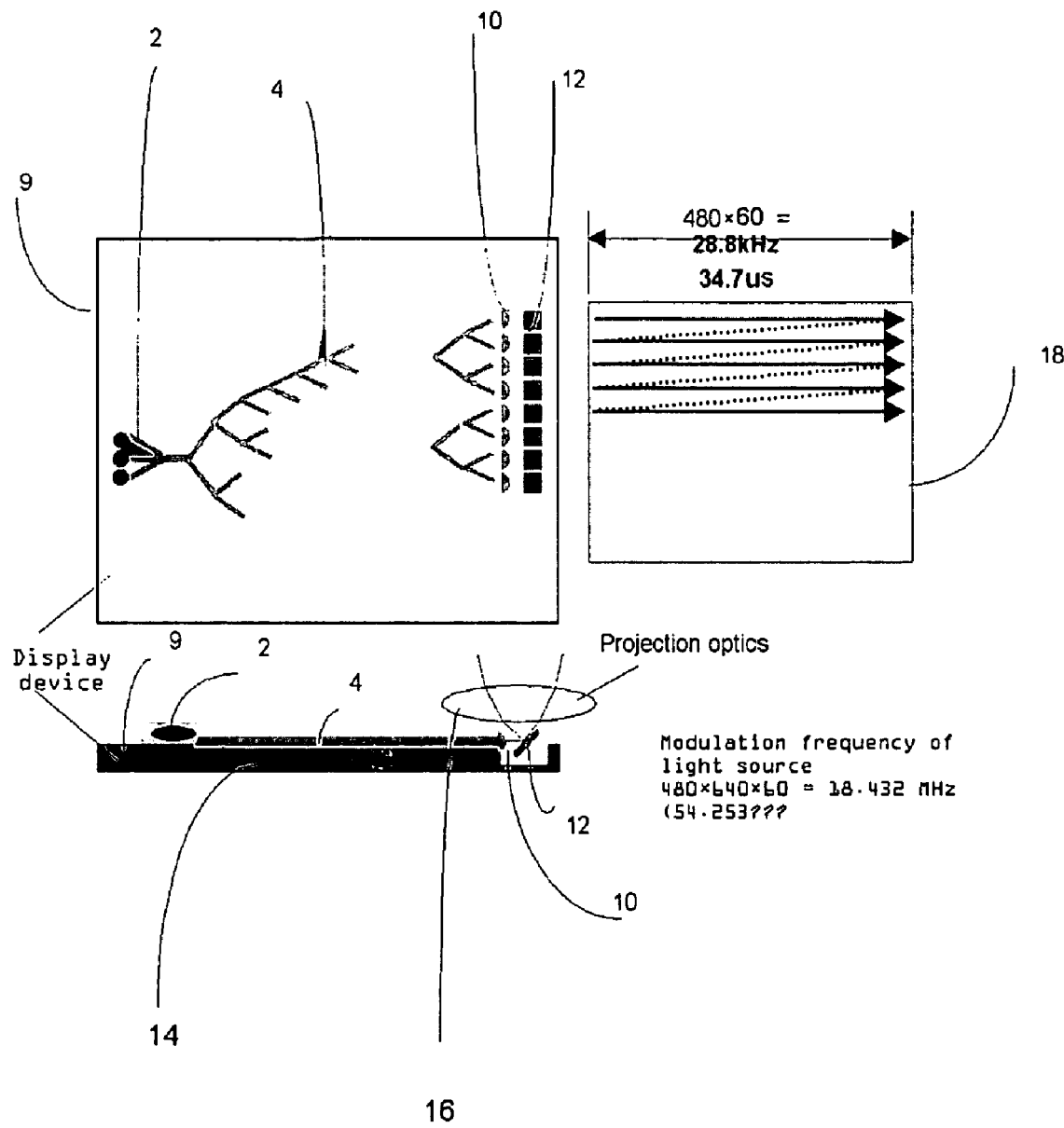
FIG. 2 is a schematic of a horizontal scanning arrangement embodying the invention and a representation of scanned raster image and its timing.

As shown in the display device 9 illustrated in FIG. 2, the light is collimated by a micro-lens 10 located at the end of each outlet of the waveguide tree. The light from each waveguide 4 is then scanned horizontally by a scanning mirror 12, as shown in FIG. 2. The micro-lens 10 and scanning mirrors 12 may be integrated on a substrate 14. The light from the scanning mirrors 12 is fed via the scanning optics 16 to a display screen which displays the generated two-dimensional image 18.

The number of optical switches 6 (or Y-shaped branches 8) M is given by the formula $M=N-1$. If n pieces of switches 6 corresponding to each row are selected properly, the incident light from the light sources 2 is led to a certain outlet of the waveguide tree. In short, n optical switches 6 are chosen so that the light is relayed continuously to a desirable outlet. Only one switch 6 has to be selected from each row along the route of light. If the light efficiency of transmission at each Y-shaped branch 8 including an optical switch 6 is 95%, the total light transmittance of the waveguide tree from one end to the other end becomes 63%. This is about five times the efficiency of LCDs. Furthermore, since the light sources 6 are adjusted according to the darkness (brightness) of each pixel, power consumption is very much smaller than that of an LCD display, whose light source has to emit at its maximum brightness all the time. For these reasons, the present invention is suitable for mobile applications operated by batteries.

Figure 3:
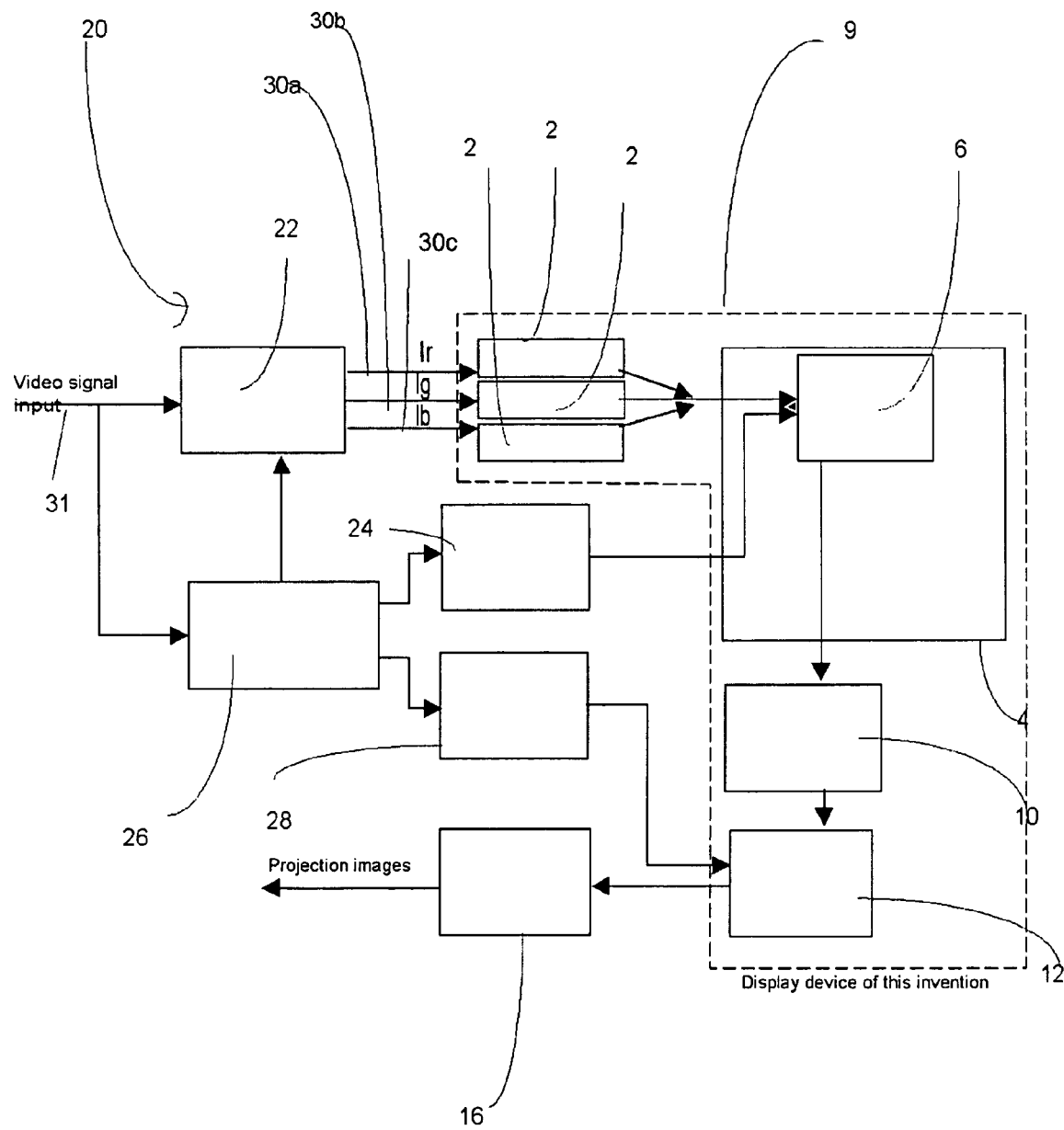
FIG. 3 is a block diagram of a projector apparatus using a display device embodying the invention.

FIG. 3 shows a block diagram of a projector apparatus 20 using the display device 9 described above. The projector apparatus 20 consists of a light modulator circuit 22, the display device 9 of FIG. 2, an optical switch controller 24, a synchronizer 26, a scanning mirror controller 28 and the projection optics 16 shown in FIG. 2. The light modulator circuit 22 generates the driving current 30a, 30b, 30c for light sources according to the brightness of the pixel from a composite video signal input 31.

Brightness and hue of a pixel are determined by an amount and a ratio of current distributed between the three colours of light sources, namely, red, green and blue. The frequency of modulation for the light sources should be around 18.432 MHz, when the resolution and the frame rate are supposed to be 480 pixels for the vertical direction, 640 pixels for the horizontal direction and 60 Hz for the frame rate.

The light modulator circuit 22 generates the driving current 30a, 30b, 30c whose frequency is 18.432 MHz for each light source. The scanning mirror controller 28 generates the driving signals for each scanning mirror 12. The driving signals of the modulator circuit 22, the optical switch controller 24 and the scanning mirror controller 28 are synchronized by the synchronizer 26 which generates the driving timings for these blocks from the sync pulses contained in the composite video signal 31.

The micro-lenses 10 may be made of transparent resin or silicon dioxide. When resin is used, a small amount of liquid resin is dropped at a desired position, and then it is polymerized by heat or ultraviolet rays. When silicon dioxide is utilized for the micro-lenses 10, a film of silica is firstly deposited and then it is etched so that it forms the desired shape.

Mirrors made by using MEMS (Micro-Electro-Mechanical Systems) technologies are particularly but not exclusively suitable for forming the horizontal scanning mirrors 12. They consist of micro-mirrors and actuators fabricated by photolithographic techniques. If the display device 9 does not have horizontal scanning mirrors, a projector apparatus having a horizontal scanning mirror may be used. A rotating polygon mirror is suitable for that purpose.

Figure 4:
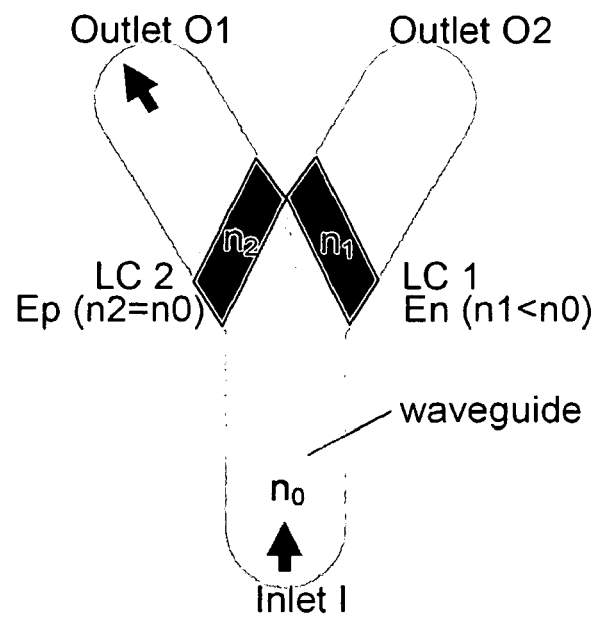
FIG. 4 is a schematic of an optical switch using liquid crystal material for use in an embodiment of the invention.

An example of an optical switch 6 is shown in FIG. 4. A pair of liquid crystal cells LC1, LC2 function as the switching elements. The switching elements LC1, LC2 are located so as to cut across the outlets O1, O2 of a Y-shaped branch 8. Ferroelectric Liquid Crystal (FLC) is suitable for use as these elements, from a viewpoint of switching speed.

When a positive electric field Ep is applied on LC1, the refractive index for LC1 becomes n0, which is equal to the refractive index of the waveguide 4. As the refractive index for LC1 is equal to that of waveguide, the light propagated in the waveguide 4 can be transmitted through LC1.

When a negative electric field En is applied on LC1, the refractive index for LC1 changes to n1. If n1 is sufficiently smaller than n0, all light going towards the outlet O2 is reflected on the boundary surface between the waveguide 4 and LC1. If a positive electric field Ep is applied on LC2, all light coming from "inlet I" can be transmitted through LC2 and "outlet O1".

Figure 5:
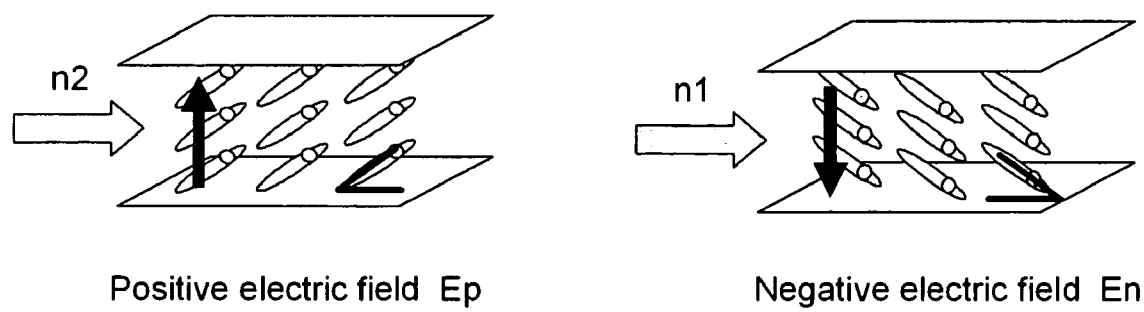
FIG. 5 is a schematic showing two states of the liquid crystal switch of FIG. 4.

FIG. 5 shows a change of states for an FLC cell of the type shown in FIG. 4.

Figure 6:
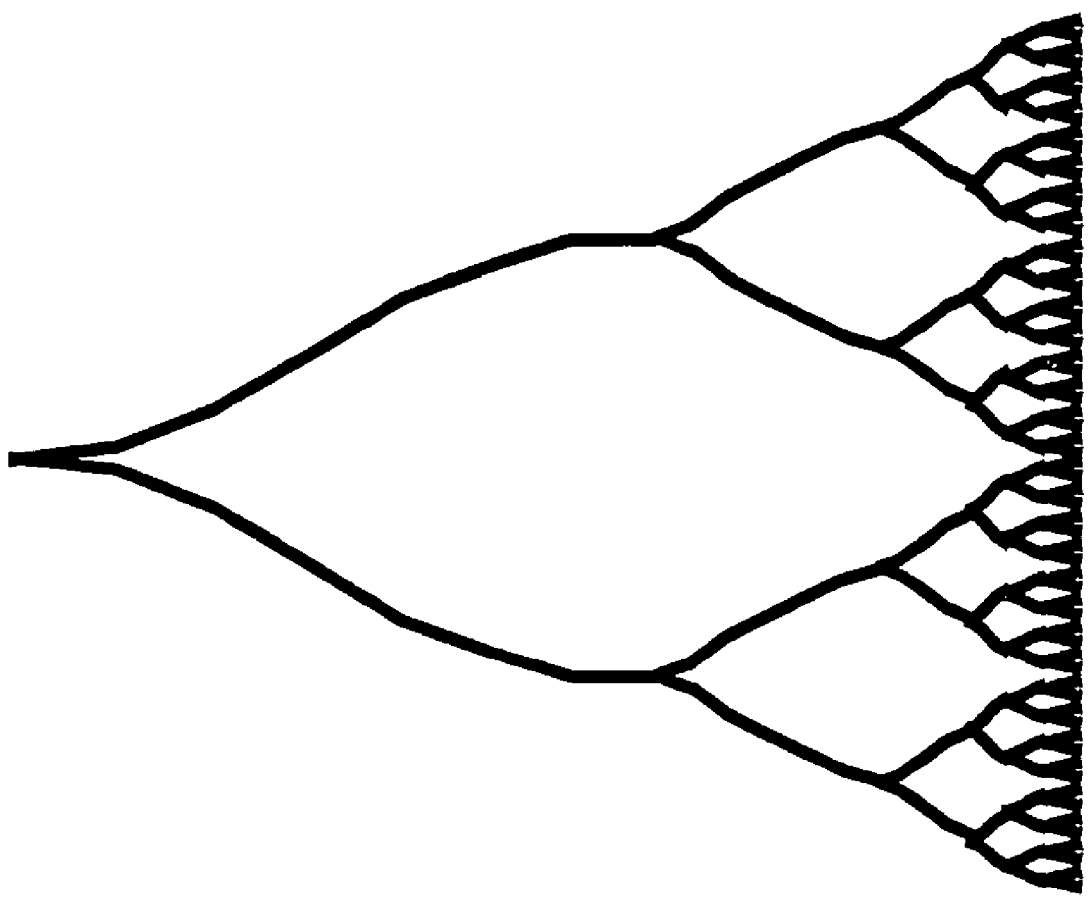
FIG. 6 is schematic of an example of waveguide design for use in an embodiment of the invention.

Though the waveguide 4 shown in FIG. 1 consists of straight segments due to simplification, the actual waveguide must have smooth curves to avoid propagation loss caused by steep bends in the waveguide. The radius of curvature for the bent waveguide should be at least several hundred times larger than its width. A design of waveguide 4 taking the bend loss into consideration is shown in FIG. 6.

The material for the core of the waveguides is required to have low absorption and dispersion for visible light. It is also important to be able to control the refractive index of the waveguide freely and accurately. Suitable waveguide materials could include acrylic or epoxy material which satisfy these requirements.

The display device 9 described above as embodying the invention has an exceedingly high light transmission efficiency because it has no component which absorbs a significant amount of light. Therefore the device does not require large light sources to operate, thereby reducing power consumption and the space required for the light sources. As the elements of this display device 9 may be integrated on one chip, the volume of the device which generates a two-dimensional image can be made small. These factors make a projector apparatus using the device compact. In this manner, the device enables a projector apparatus to be extremely small and have a much reduced power consumption in comparison with conventional projectors. The present invention thereby helps to realize mobile image projectors operated by batteries.

Various modifications to the embodiments of the present invention described above may be made. For example, other materials and method steps can be added or substituted for those above. In particular, in this description, a waveguide tree which generates the vertical pixels and whose scanning mirrors generate the horizontal pixels has been described as a preferred example. However, other constructions are possible. For example, the horizontal pixels may be generated by the waveguide tree and the vertical pixels may be generated by the scanning mirrors. Alternatively, both the vertical and the horizontal pixels may be generated by the waveguide trees. In such a configuration the vertical pixels may be produced in a first waveguide tree and each pixel output is fed into a respective further waveguide tree which is oriented at right angles to the first waveguide tree, the outputs of the further waveguide trees producing the horizontal pixels in the image. Thus, although the invention has been described above using particular embodiments, many variations are possible within the scope of the claims, as will be clear to the skilled reader, without departing from the spirit and scope of the invention.

The invention claimed is:

1. A waveguide system, comprising:
   one or more light sources;
   an array of interconnected waveguides arranged to receive light from said one or more light sources;
   a plurality of optical switches associated with the array of waveguides and arranged so as to divert the light from the one or more light sources received by the waveguides to one or more outputs;
   one or more micro-lenses arranged at the outputs of the waveguides to collimate the light transmitted therethrough; and
   one or more scanning mirrors arranged at the outputs of the waveguides to deflect the light received from the one or more micro-lenses to form an image.

2. A system according to claim 1, wherein said one or more scanning mirrors are arranged on a common substrate with one or more of said one or more lights sources, said array of interconnected waveguides, said plurality of optical switches, and said one or more micro-lenses.

3. A system according to claim 1, wherein said array of waveguides comprises a plurality of Y-shaped branches.

4. A system according to claim 1, wherein said scanning mirrors are arranged to scan in a directional plane substantially orthogonal to the plane of the outlets of the array of waveguides to produce a two-dimensional image.

5. A device for displaying an image, comprising:
   one or more light sources;
   an array of interconnected waveguides arranged to receive light from said one or more light sources;
   a plurality of optical switches associated with the array of waveguides and arranged so as to divert the light from the one or more light sources received by the waveguides to one or more outputs;
   an optical switch controller for selecting the outputs of the array of waveguides in sequence to produce a linear scan pattern; and
   a scanning mirror controller for deflecting one or more scanning mirrors to produce a further linear scan pattern.

6. A device according to claim 5, wherein said linear scan pattern is a horizontal scan pattern, or a vertical scan pattern.

7. A device according to claim 5, wherein said further linear scan pattern is a horizontal scan pattern, or a vertical scan pattern.

8. A device according to claim 5, further comprising:
   a modulator for modulating said one or more light sources; and
   a video input signal for driving said modulator.

9. A device according to claim 5, further comprising:
   one or more micro-lenses arranged at the outputs of the waveguides to collimate the light transmitted therethrough; and
   an arrangement of projection optics to receive the outputs from the micro-lenses, said outputs from said micro-lenses being projectable through said projection optics onto a screen to produce a two-dimensional image.

10. A device for displaying an image, comprising:
    one or more light sources;
    a modulator for modulating said one or more light sources according to an input signal;
    an array of interconnected waveguides arranged to receive light from said one or more light sources;
    a plurality of optical switches associated with the array of waveguides and arranged so as to divert the light from the one or more light sources received by the waveguides to one or more outputs;
    an optical switching controller for diverting light from said one or more light sources to each output of the array of waveguides in sequence and for selecting the outputs of the array of waveguides in sequence to produce a linear scan pattern;
    a scanning micro-controller for driving one or more scanning mirrors to deflect collimated light from said array of waveguides in a plane substantially orthogonal to the plane of the waveguide array;
    a synchroniser arranged to regulate operation of said scanning mirrors and said optical switch controller; and
    a projection optics arrangement to focus the scanned outputs from the array of waveguides onto a screen.

11. A device according to claim 10, further comprising:
    a synchroniser arranged to regulate operation of said optical switch controller.

12. A device for displaying an image, comprising:
    one or more light sources;
    a first array of interconnected waveguides lying in a first place and arranged to receive light from said one or more light sources;
    a second array of waveguides lying in a second plane and connectable to each output of said first array of interconnecting waveguides, said second plane being substantially orthogonal to said first plane;
    a plurality of optical switches associated with the first array and the second array of waveguides and arranged so as to divert the light from the one or more light sources received by the first array and the second array of waveguides to one or more outputs;
    a plurality of micro-lenses connectable to the outputs of said second array of waveguides;
    an optical switch controller for selecting the outputs of the first array of waveguides in sequence to produce a linear scan pattern and for controlling the switches in said first array and said second array of waveguides; and
    a projection optics arrangement to focus the outputs of the second array onto a screen to produce an image.

13. An information display device, comprising:
    one or more light sources;
    an array of interconnected waveguides arranged to receive light from said one or more light sources and arranged to form a tree-like structure having a plurality of branches and a plurality of junctions connecting said branches;
    a plurality of optical switches associated with the array of waveguides and arranged so as to divert the light from the one or more light sources received by the waveguides to one or more outputs;
    one or more micro-lenses arranged at the outputs of the waveguides to collimate the light transmitted therethrough; and
    one or more scanning mirrors arranged at the outputs of the waveguides to deflect the light received from the one or more micro-lenses to form an image.

14. A projection display devices, comprising:
    one or more light sources;
    an array of interconnected waveguides arranged to receive light from said one or more light sources and arranged to form a tree-like structure having a plurality of branches and a plurality of junctions connecting said branches;
    a plurality of optical switches associated with the array of waveguides and arranged so as to divert the light from the one or more light sources received by the waveguides to one or more outputs;

one or more micro-lenses arranged at the outputs of the waveguides to collimate the light transmitted therethrough; and one or more scanning mirrors arranged at the outputs of the waveguides to deflect the light received from the one or more micro-lenses to form an image.

15. An information display device, comprising:

one or more light sources;

an array of interconnected waveguides arranged to receive light from said one or more light sources;

a plurality of optical switches associated with the array of waveguides and arranged so as to divert the light from the one or more light sources received by the waveguides to one or more outputs;

an optical switch controller for selecting the outputs of the array of waveguides in sequence to produce a linear scan pattern; and a scanning mirror controller for deflecting the one or more scanning mirrors to produce a further linear scan pattern.

16. A projection display device, comprising:

one or more light sources;

an array of interconnected waveguides arranged to receive light from said one or more light sources;

a plurality of optical switches associated with the array of waveguides and arranged so as to divert the light from the one or more light sources received by the waveguides to one or more outputs;

an optical switch controller for selecting the outputs of the array of waveguides in sequence to produce a linear scan pattern; and a scanning mirror controller for deflecting the one or more scanning mirrors to produce a further linear scan pattern.

17. The system according to claim 1, wherein said array of interconnected waveguides is arranged to form a tree-like structure having a plurality of branches and a plurality of junctions connecting said branches.

18. The system according to claim 1, wherein said optical switches are arranged at said junctions.

19. The system according to claim 1, wherein two or more of said one or more lights sources, said array of interconnected waveguides, and said plurality of optical switches are arranged on a common substrate.

20. The system according to claim 1, wherein said one or more micro-lenses are arranged on a common substrate with one or more of said one or more lights sources, said array of interconnected waveguides and said plurality of optical switches.

* * * * *